United States Patent
Kushioka (10) Patent No.: US 8,189,712 B2
(45) Date of Patent: May 29, 2012

(54) COMMUNICATIONS DEVICE

(75) Inventor: Yoichi Kushioka, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 869 days.

(21) Appl. No.: 12/222,815

(22) Filed: Aug. 18, 2008

(65) Prior Publication Data

US 2009/0080550 A1 Mar. 26, 2009

(30) Foreign Application Priority Data

Sep. 25, 2007 (JP) ................................. 2007-246396

(51) Int. Cl.
*H04L 27/00* (2006.01)

(52) U.S. Cl. ....................................... 375/295; 375/267

(58) Field of Classification Search .................. 375/260, 375/267, 295
See application file for complete search history.

(56) References Cited

U.S. PATENT DOCUMENTS

| | | | | |
|---|---|---|---|---|
| 2008/0232432 A1* | 9/2008 | Lee et al. | | 375/140 |
| 2008/0240285 A1* | 10/2008 | Han et al. | | 375/295 |
| 2008/0267303 A1* | 10/2008 | Baldemair et al. | | 375/260 |
| 2008/0273582 A1* | 11/2008 | Gaal et al. | | 375/224 |
| 2008/0291945 A1* | 11/2008 | Luo | | 370/509 |
| 2009/0046691 A1* | 2/2009 | Karjalainen et al. | | 370/342 |
| 2009/0080500 A1* | 3/2009 | Muharemovic et al. | | 375/146 |

FOREIGN PATENT DOCUMENTS

| | | |
|---|---|---|
| EP | 1 919 232 | 5/2008 |
| JP | 2007-89108 | 4/2007 |

* cited by examiner

*Primary Examiner* — Chieh M Fan
*Assistant Examiner* — Freshten N Aghdam
(74) *Attorney, Agent, or Firm* — Bacon & Thomas, PLLC (57) ABSTRACT

A communications device for generating a Zadoff-Chu sequence includes a storage unit storing real and imaginary part values of $\exp\{-j\cdot(2\pi/N)\cdot(m/2)\}$ for the Zadoff-Chu sequence of the sequence length N, wherein m is an integer ($0 \leq m < (N+1)/2$); a parameter acquisition unit acquiring a sequence number u, data number k, cyclic shift amount $\Delta$ and cyclic shift number Ncs; a phase position detecting unit detecting a phase position of the Zadoff-Chu sequence with acquired parameters; and a sequence determination unit determining m to read a real and an imaginary part value in the storage unit based on the phase position and determining a plus/minus sign of each of the real and the imaginary part value. The device further includes a sequence acquisition unit acquiring the Zadoff-Chu sequence by using the real and the imaginary part values according to m determined by the sequence determination unit and the signs thereof determined.

1 Claim, 10 Drawing Sheets

| SEQUENCE TABLE | Tb1[0] | Tb1[1] | Tb1[2] | Tb1[3] | Tb1[4] | Tb1[5] | Tb1[6] | Tb1[7] | Tb1[8] | Tb1[9] |
|---|---|---|---|---|---|---|---|---|---|---|
| m | 0 | 1 | 2 | 3 | 4 | 5 | 6 | 7 | 8 | 9 |
| REAL PART $=\cos\left(\frac{2\pi}{19} \cdot \frac{m}{2}\right)$ | 1 | 0.9864 | 0.9458 | 0.8795 | 0.7892 | 0.6773 | 0.5470 | 0.4017 | 0.2455 | 0.0826 |
| IMAGINARY PART $=-\sin\left(\frac{2\pi}{19} \cdot \frac{m}{2}\right)$ | 0 | -0.1646 | -0.3247 | -0.4760 | -0.6142 | -0.7357 | -0.8372 | -0.9158 | -0.9694 | -0.9966 |

| SEQUENCE TABLE | Tb1[0] | Tb1[1] | Tb1[2] | Tb1[3] | Tb1[4] | Tb1[5] | Tb1[6] | Tb1[7] | Tb1[8] | Tb1[9] |
|---|---|---|---|---|---|---|---|---|---|---|
| s | 0 | 1 | 2 | 3 | 4 | 5 | 6 | 7 | 8 | 9 |
| REAL PART $= \cos\left[\frac{2\pi \cdot 2}{19} \cdot \frac{s(s+1)}{2}\right]$ | 1 | 0.7891 | −0.4017 | −0.6773 | 0.9458 | −0.8795 | 0.2455 | −0.9458 | 0.2455 | −0.0826 |
| IMAGINARY PART $= -\sin\left[\frac{2\pi \cdot 2}{19} \cdot \frac{s(s+1)}{2}\right]$ | 0 | −0.6142 | −0.9158 | −0.7357 | −0.3247 | −0.4759 | −0.9694 | −0.3247 | 0.9694 | −0.9966 |

FIG. 10
(PRIOR ART)

COMMUNICATIONS DEVICE

FIELD OF THE INVENTION

The present invention relates to a communications device for generating a Zadoff-Chu sequence; and, more particularly, to a communications device for effectively generating a Zadoff-Chu sequence.

BACKGROUND OF THE INVENTION

For example, a Zadoff-Chu sequence has been used as a pilot signal in a transmitter or receiver of a wireless communications system for providing wireless communications by using OFDM (Orthogonal Frequency Division Multiplexing) (see, e.g., Japanese Patent Laid-open Publication No. 2007-89108). The pilot signal can be used as a basis to determine an amplitude or phase of a communications signal.

The Zadoff-Chu sequence belongs to a CAZAC (constant amplitude zero autocorrelation) sequence family and is suitable for OFDM due to its orthogonality.

Figure 10:
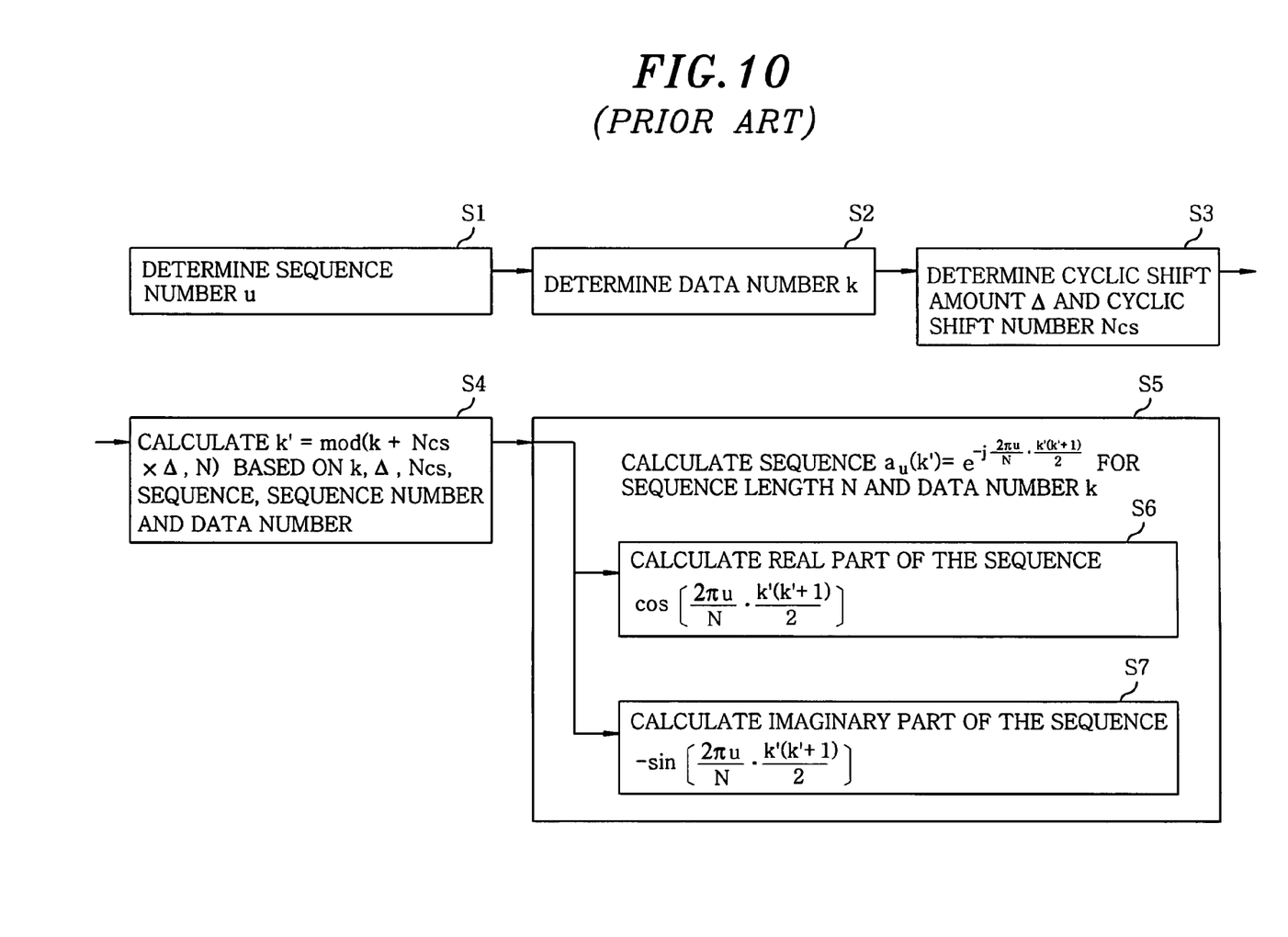
FIG. 10 is a flow chart for describing an exemplary process for generating a Zadoff-Chu sequence in accordance with a conventional technique.

FIG. 10 is a flow chart for describing an exemplary process including steps (1) to (7) for generating a Zadoff-Chu sequence.

First, parameters of the Zadoff-Chu sequence will be described.

A sequence length N thereof is a prime number (odd number) and its period is 2N.

A sequence number u thereof is a code number and is, for example, constant. Further, several numbers or kinds of sequence numbers u may be provided.

A data number k thereof changes consecutively such as 0, 1, 2, . . . , and so forth.

A cyclic shift amount $\Delta$ thereof indicates an initial position and is, for example, constant.

A cyclic shift number Ncs thereof is, for example, constant.

Further, mod (A, B) indicates a remainder when A is divided by B.

Next, a process for generating a Zadoff-Chu sequence is described as follows:

(1) The sequence number u is determined (step S1);
(2) The data number k is determined (step S2);
(3) The cyclic shift amount $\Delta$ and the cyclic shift number Ncs are determined (step S3);
(4) k'=mod(k+Ncs×$\Delta$, N) is calculated by using the above parameters (step S4). Herein, k' that is greater than the sequence length N is converted into a value equal to or less than N since the data number k is shifted by Ncs ×$\Delta$ by the cyclic shift;
(5) The $K^{th}$ Zadoff-Chu sequence $a_u(k')$ represented by Equation 1 is generated (step S5);

$$a_u(k') = e^{-j\frac{2\pi u}{N} \cdot \frac{k'(k'+1)}{2}} \quad \text{[Equation 1]}$$

$$= \cos\left(\frac{2\pi u}{N} \cdot \frac{k'(k'+1)}{2}\right) - j\sin\left(\frac{2\pi u}{N} \cdot \frac{k'(k'+1)}{2}\right)$$

$$= \alpha + j\beta$$

$$\alpha = \cos\left(\frac{2\pi u}{N} \cdot \frac{k'(k'+1)}{2}\right)$$

$$\beta = -\sin\left(\frac{2\pi u}{N} \cdot \frac{k'(k'+1)}{2}\right)$$

The real part $\alpha$ and imaginary part $\beta$ are separately calculated.

(6) The real part $\alpha$ of the Zadoff-Chu sequence au(k') is calculated (step S6); and
(7) The imaginary part $\beta$ of the Zadoff-Chu sequence au(k') is calculated (step S7).

An approximation such as Taylor series is used to calculate sin or cos by. However, the approximation may be not accurate enough. Further, the order has to be increased to enhance the accuracy, which in return increases the computational burden.

As described above, a Zadoff-Chu sequence with high accuracy is not easily generated by using the conventional method.

For example, a Zadoff-Chu sequence in 3GPP-LTE (3Generation Partnership Project—Long Term Evolution) which is the next generation mobile communications method has been used for channel estimation, CQI (Channel Quality Indicator) measurement, bus location measurement and the like. Therefore, a wireless terminal or base station needs to generate a sequence with high accuracy by minimal processing, which could not be achieved by a conventional method using the approximation.

SUMMARY OF THE INVENTION

In view of the above, the present invention provides a communications device capable of effectively generating a Zadoff-Chu sequence.

In accordance with an aspect of the present invention, there is provided a communications device for generating a Zadoff-Chu sequence value in accordance with a following configuration, which corresponds to a first embodiment of the invention. Herein, exp(W) represents $e^w$ and j is an imaginary number.

That is, a storage unit stores real and imaginary part values of $\exp\{-j\cdot(2\pi/N)\cdot(m/2)\}$ for the Zadoff-Chu sequence of the sequence length N, wherein m is an integer satisfying the relation of $0 \leq m < (N+1)/2$. A parameter acquisition unit acquires a sequence number u, data number k, cyclic shift amount $\Delta$ and cyclic shift number Ncs. A phase position detection unit detects a phase position of the Zadoff-Chu sequence by using parameters acquired by the parameter acquisition unit. A sequence determination unit determines m to be used to read a real and an imaginary part value among those stored in the storage unit based on the phase position detected by the phase position detecting unit and also determines whether to change the plus/minus sign of each of the real and the imaginary part value read from the storage unit. A sequence acquisition unit acquires the Zadoff-Chu sequence by using the real and the imaginary part value read from the storage unit according to m determined by the sequence determination unit, and the signs thereof determined by the sequence determination unit.

Therefore, the Zadoff-Chu sequence can be effectively generated. To be specific, the sequence value with high accuracy can be obtained by minimal processing and the memory use can be reduced since less data is stored.

Here, parameters such as the sequence length N, the sequence number u, the data number k and the cyclic shift amount $\Delta$ and the cyclic shift number Ncs may have arbitrarily selected values and, for example, each parameter value can be set in advance in the communications device by programs. Further, each parameter value may be varied if necessary.

Further, the storage unit may be a memory.

Further, e.g., a position in a quadrant such as the first to fourth quadrants on the complex plane may be used for the phase position.

Further, the plus/minus signs of the real and the imaginary part value may be maintained as they are or may be reversed.

In accordance with another aspect of the present invention, there is provided a communications device for generating a Zadoff-Chu sequence value in accordance with a following configuration, which corresponds to a second embodiment. Herein, exp(W) indicates $e^w$ and j is an imaginary number.

That is, a storage unit stores real and imaginary part values of $\exp\{-j\cdot(2\pi u/N)\cdot(s(s+1)/2)\}$ for the Zadoff-Chu sequence of the sequence length N and sequence number u, wherein s is an integer satisfying the relation of $0 \leq s < (N+1)/2$. A parameter acquisition unit acquires the sequence number u, data number k, cyclic shift amount $\Delta$ and cyclic shift number Ncs. A sequence determination unit determines s to be used to read a real and an imaginary part value among those stored in the storage unit by using parameters acquired by the parameter acquisition unit. A sequence acquisition unit acquires the real and the imaginary part value read from the storage unit according to s determined by the sequence determination unit as the Zadoff-Chu sequence.

Therefore, the Zadoff-Chu sequence can be effectively generated. To be specific, the sequence value with high accuracy can be obtained by minimal processing and the memory use can be reduced since less data is stored.

Here, parameters such as the sequence length N, the sequence number u, the data number k and the cyclic shift amount $\Delta$ and the cyclic shift number Ncs may have arbitrarily selected values and, for example, each parameter value can be set in advance in the communications device by programs. Further, each parameter value may be varied if necessary.

Further, the storage unit may be a memory.

As described above, the communications device of the present invention can effectively generate a Zadoff-Chu sequence.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
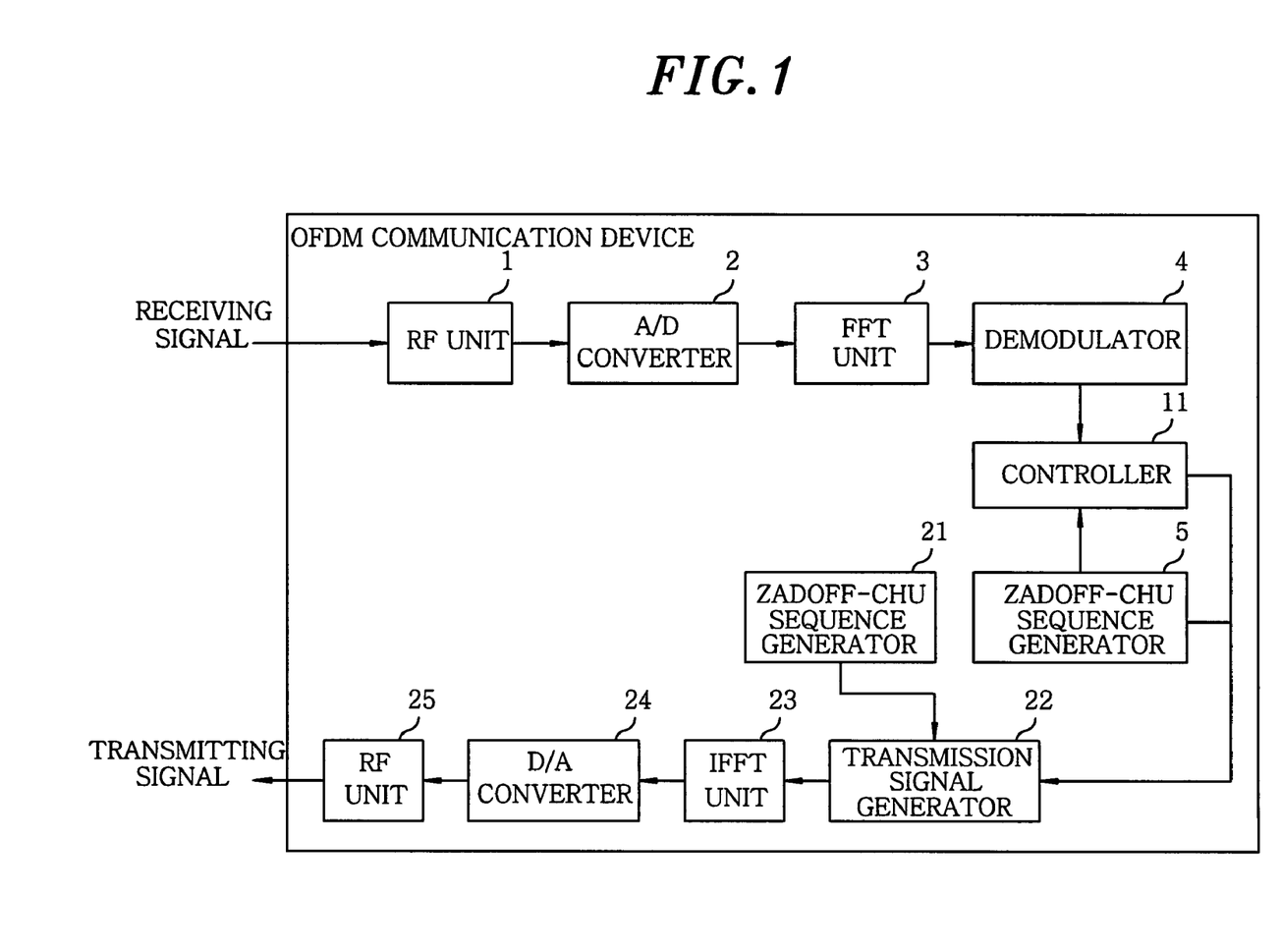
FIG. 1 is an exemplary configuration view of an OFDM communications device in accordance with an embodiment of the present invention.

FIG. 1 is an exemplary configuration view of an OFDM communications device in accordance with an embodiment of the present invention.

The OFDM communications device is installed in a wireless terminal or base station.

The OFDM communications device of the present embodiment includes an RF (Radio Frequency) unit 1, an A/D (Analog to Digital) converter 2, an FFT (Fast Fourier Transform) unit 3, a demodulator 4, a Zadoff-Chu sequence generator 5, a controller 11, a Zadoff-Chu sequence generator 21, a transmission signal generator 22, an IFFT (Inverse FFT) unit 23, a D/A (Digital to Analog) converter 24 and an RF unit 25.

The operation of the OFDM communications device of the embodiment will be described hereinafter.

An example of a receiving side will be described first.

A wireless signal received by an antenna (not shown) is fed to the RF unit 1. The RF unit 1 performs a frequency conversion of the signal and the like and outputs a resultant signal to the A/D converter 2.

Here, the received signal has been OFDM-modulated at a transmitting side. Further, the received signal includes a pilot signal using a Zadoff-Chu sequence or data signal inserted from the transmitting side.

The A/D converter 2 converts an analog signal fed from the RF unit 1 into a digital signal and transmits it to the FFT unit 3.

The FFT unit 3 performs an FFT (Fast Fourier Transform) on the signal outputted from the A/D converter 2 and transmits a resultant signal, i.e. a signal obtained after the FFT operation, to the demodulator 4.

The demodulator 4 demodulates the signal fed from the FFT unit 3 and transmits the demodulated signal to the controller 11.

The Zadoff-Chu sequence generator 5 generates and transmits a Zadoff-Chu sequence to the controller 11.

The controller 11 compares the Zadoff-Chu sequence from the Zadoff-Chu sequence generator 5 to the pilot signal included in the received signal. The comparison result is used for channel measurement, CQI measurement, bus location measurement and the like.

Further, the controller 11 acquires the received data from the demodulated signal from the demodulator 4.

An example of the transmitting side will be described hereinafter.

The controller 11 outputs data for transmission to the transmission signal generator 22.

The Zadoff-Chu sequence generator 21 generates and transmits a Zadoff-Chu sequence to the transmission signal generator 22.

The transmission signal generator 22 generates and transmits a transmission signal, which includes the data outputted from the controller 11 and Zadoff-Chu sequence outputted from the Zadoff-Chu sequence generator 21 as a pilot signal, to the IFFT unit 23.

The IFFT unit 23 performs an IFFT (Inverse Fast Fourier Transform) on the transmission signal outputted from the transmission signal generator 22 and outputs a resultant signal, i.e. a signal obtained after the IFFT operation, to the D/A converter 24.

The D/A converter 24 converts the analog signal outputted from the IFFT unit 23 into a digital signal and transmits it to the RF unit 25.

The RF unit 25 performs a frequency conversion of the signal fed from the D/A converter 24, i.e. the transmission signal, and the like and wirelessly transmits a resultant signal via the antenna (not shown).

The first embodiment will be described.

In the present embodiment, the process performed at the Zadoff-Chu sequence generator 5 or 21 of the OFDM communications device shown in FIG. 1 will be mainly described.

Figure 2:
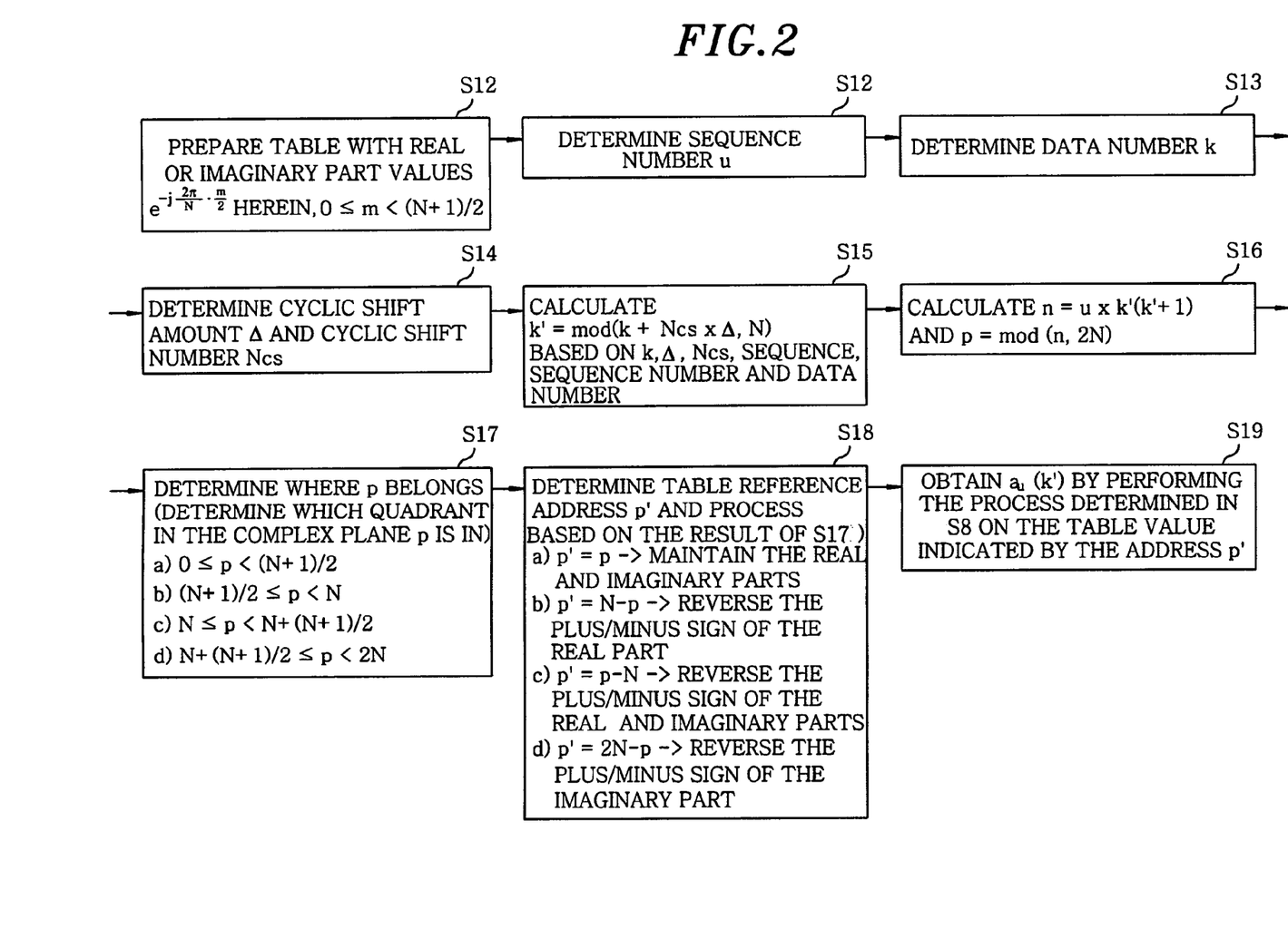
FIG. 2 is a flow chart for describing an exemplary process for generating a Zadoff-Chu sequence in accordance with a first embodiment.

FIG. 2 is a flow chart for describing an exemplary process including steps (1) to (9) for generating a Zadoff-Chu sequence.

First, parameters of the Zadoff-Chu sequence are described.

The sequence length N is a prime number (odd number) and the period is 2N.

The sequence number u is a code number and is, for example, constant. Further, several numbers or kinds of sequence numbers u may be provided.

The data number k changes consecutively such as 0, 1, 2, . . . , and so forth.

The cyclic shift amount Δ indicates an initial position and is, for example, constant.

The cyclic shift number Ncs is, for example, constant.

Further, mod (A, B) indicates a remainder when A is divided by B.

Next, the process for generating a Zadoff-Chu sequence is described as follows.

(1) Each value of a real part and imaginary part of γ represented by Equation 2 for each m satisfying a relation of $0 \leq m < (N+1)/2$ is provided in a memory table (step S11). Therefore, $(N+1)/2$ values for each part are provided.

Herein, although 2N values are usually needed, only $(N+1)/2$ values are used in the present embodiment.

$$\gamma = e^{-j\frac{2\pi}{N} \cdot \frac{m}{2}} \quad \text{[Equation 2]}$$

(2) The sequence number u is determined (step S12).

(3) The data number k is determined (step S13).

(4) The cyclic shift amount Δ and the cyclic shift number Ncs are determined (step S14).

(5) k'=mod(k+Ncs×Δ, N) is calculated by using the above parameters (step S15). Herein, k' which is greater than the sequence length N is converted into a value equal to or less than N since the data number k is shifted by Ncs ×Δ by the cyclic shift.

(6) n=u×k' (k'+1) is calculated by using the sequence number u and k' obtained in the step (5). Then, p=mod (n, 2N) which is a remainder when n is divided by 2N is calculated (step S16).

Here, n serves as a phase component in Z(n) represented by Equation 3 in a conventional method and arg(Z(n))=arg(Z(n+2qN)) for an arbitrary integer q. With consideration of this, p is obtained by converting n to be limited to the range of 2N.

$$Z(n) = e^{-j\frac{2\pi}{N} \cdot \frac{n}{2}} \quad \text{[Equation 3]}$$

(7) It is determined where p belongs to among the following four patterns (step S17). This is to determine which quadrant in the complex plane p is in.

a) $0 \leq p < (N+1)/2$
b) $(N+1)/2 \leq p < N$
c) $N \leq p < N+(N+1)/2$
d) $N+(N+1)/2 \leq p < 2N$ (8) A table reference address p' and a process to be performed on a table value indicated by the table reference address p' are determined based on a pattern where p belongs to (step S18). A detailed description thereof is as follows:

In case of the pattern a), p'=p and the real and imaginary parts of the table value are maintained;

In case of the pattern b), p'=N−p and the plus/minus sign of the real part of the table value is reversed;

In case of the pattern c), p'=p−N and the plus/minus sign of the real and imaginary parts of the table value are all reversed; and In case of the pattern d), p'=2N−p and the plus/minus sign of the imaginary part of the table value is reversed.

(9) The table value corresponding to the table reference address p' is obtained; the corresponding process determined in the step (8) is performed for the obtained table value; and the $K^{th}$ sequence $a_u(k)$ is calculated step (S19).

In the steps (7) to (9), the sequence value is obtained by adjusting the signs of the table values based on the regularities of the Zadoff-Chu sequence.

In the step (7), there are the four patterns ranged based on p value. With this, it is determined which quadrant on the complex plane Z(p) represented by Equation 4 is in.

$$Z(p) = e^{-j\frac{2\pi}{N} \cdot \frac{p}{2}} \quad \text{[Equation 4]}$$

Figure 3:
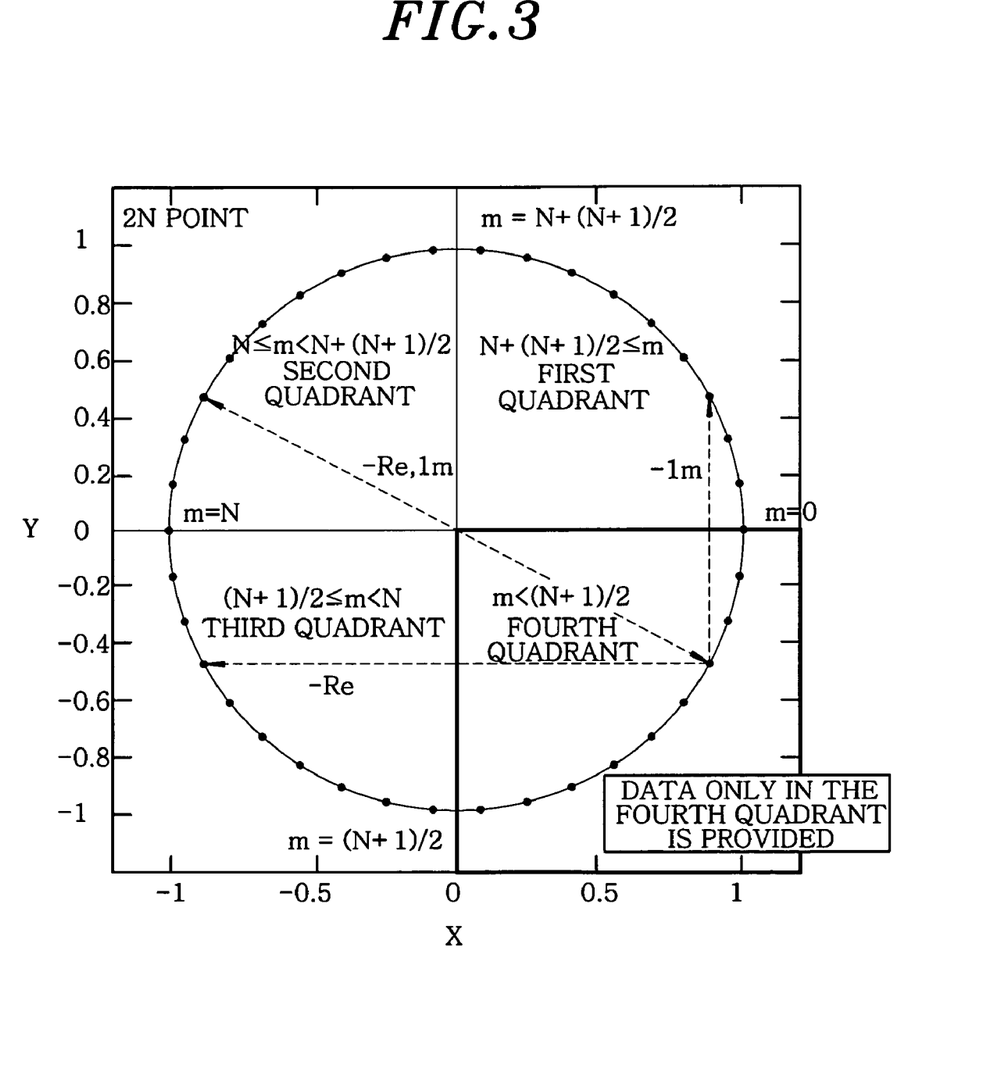
FIG. 3 shows an example of the arrangement of $\exp\{(-j)\cdot(2\pi/N)\cdot(m/2)\}$ forming a Zadoff-Chu sequence on a complex plane.

FIG. 3 shows an example of an arrangement of γ represented by Equation 2 for generating a Zadoff-Chu sequence on the complex plane.

γ moves in a clockwise direction. That is, γ is in the fourth quadrant in case of $0 \leq m < (N+1)/2$, in the third quadrant in case of $(N+1)/2 \leq m < N$, in the second quadrant in case of $N \leq m < N+(N+1)/2$ and in the first quadrant in case of $N+(N+1)/2 \leq m < 2N$.

In the step (8), the table reference address p' and the process to be performed on the table value are determined based on the pattern chosen in the step (7). The table data prepared in the step (1) provides only $(N+1)/2$ values, whereas 2N values are normally needed. This is because data only in the fourth quadrant shown in FIG. 3 are provided in the table.

As can be seen from FIG. 3, the values in the first to third quadrants can be represented by changing the plus/minus sign of the values in the fourth quadrant. In the step (8), it is determined how to change the address of the data in the fourth quadrant into the address in each quadrant and how to adjust the plus/minus sign. In the step (9), the sequence value is obtained by adjusting the plus/minus sign of the table value corresponding to the determined address p'.

An example will be described in detail.

Figure 4:
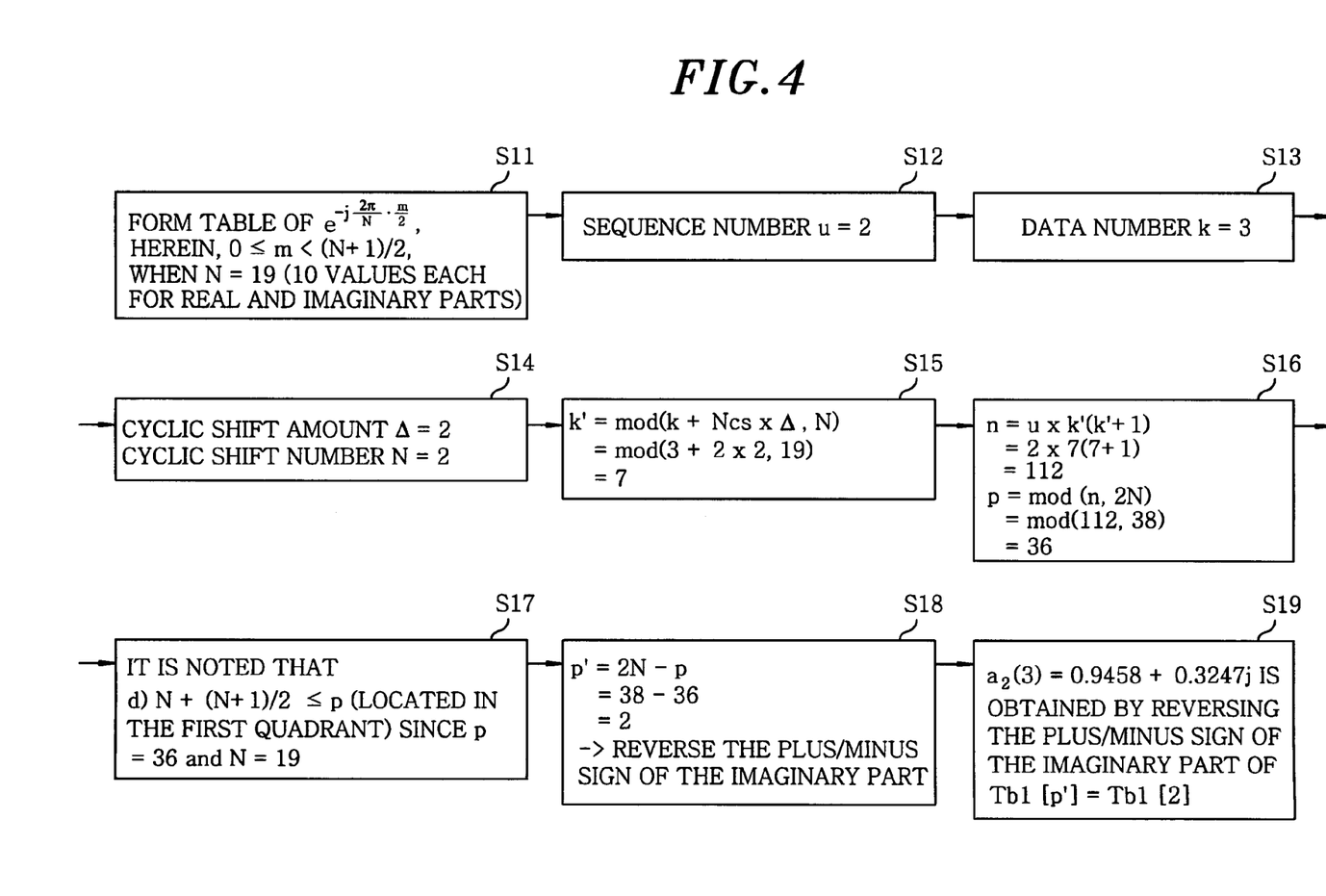
FIG. 4 is a flow chart for describing an exemplary process for generating a Zadoff-Chu sequence.

FIG. 4 is a flow chart for describing an exemplary process including steps (1) to (9) for generating a Zadoff-Chu sequence, which is a specific example of the process shown in FIG. 2.

(1) In this example, N=19. Each value of the real part and imaginary parts of γ represented by Equation 2 for each m satisfying a relation of $0 \leq m < (N+1)/2$ is provided in a table Tb1[].

(2) Therefore, ten, i.e. $(N+1)/2$, values for each part are provided in the table (step S11).

Figure 5:
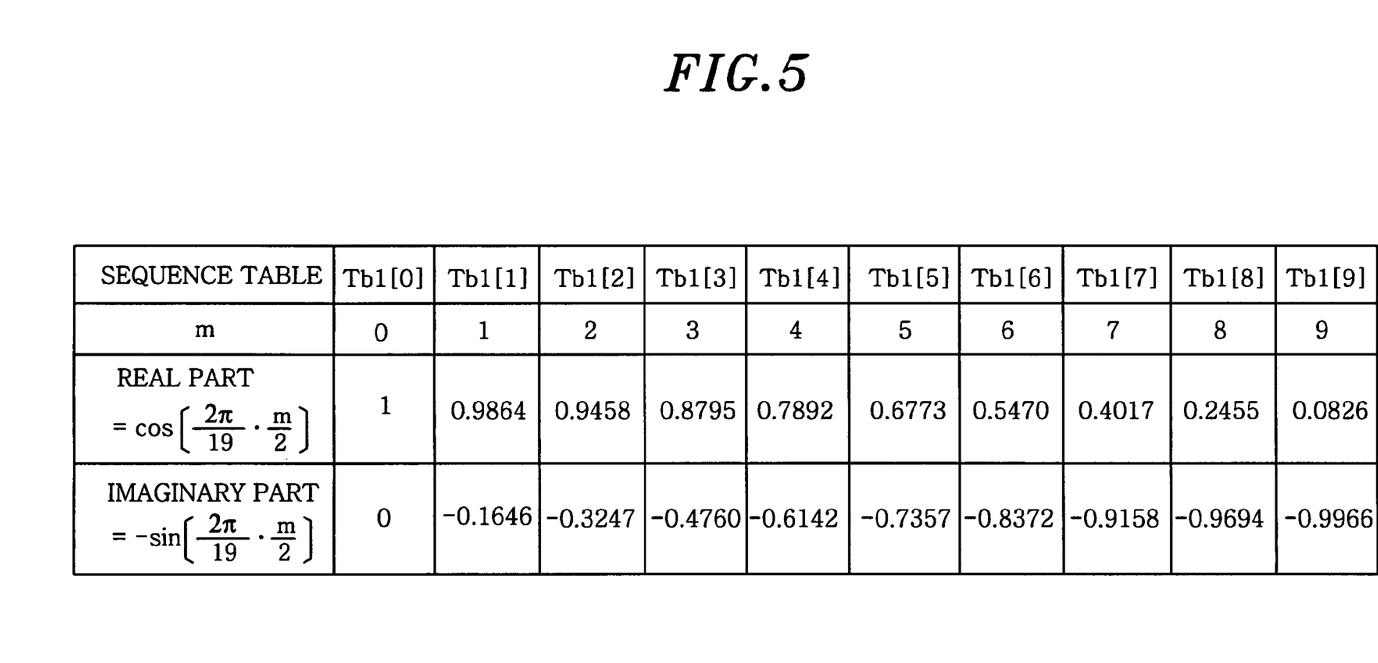
FIG. 5 shows an example of the table when N=19.

FIG. 5 show an example of the table when N=19.

(3) The sequence number u is determined. Herein, u=2 (step S12).

(4) The data number k is determined. Herein, k=3 (step S13).

(5) The cyclic shift amount Δ and the cyclic shift number Ncs are determined. Herein, Δ=2 and Ncs=2 (step S14).

(6) k'=mod(k+Ncs×Δ, N) is calculated by using the above parameters. Herein, k'=7 (step S15).

(7) n=u×k'(k'+1) is calculated by using the sequence number u and k' obtained in the step (5). In the example, n=112. Then, p=mod (n, 2N) is calculated. Herein, p=36 (step S16).

(8) Pattern classification based on p is performed. In this example, since p=36 and N=19, N+(N+1)/2≦p and Z(p) is located in the first quadrant (step S17).

Figure 6:
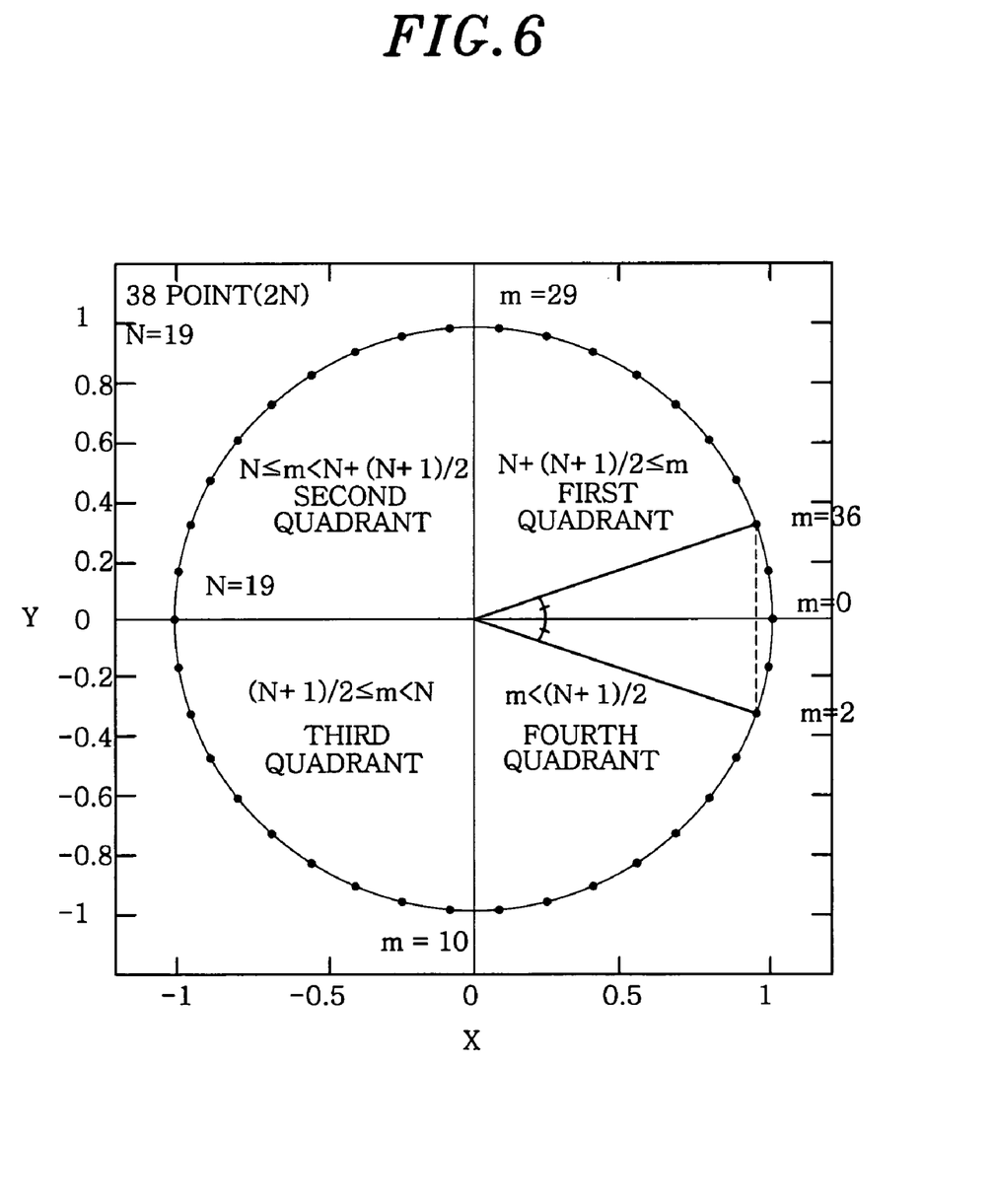
FIG. 6 shows an example of the arrangement of the Zadoff-Chu sequence on the complex plane when N=19.

FIG. 6 shows an example of an arrangement of the Zadoff-Chu sequence on the complex plane when N=19.

Referring to FIG. 6, Z(p) represented by Equation 4 is located in the first quadrant.

(9) The table reference address p' and the process for adjusting the plus/minus sign of the table values are determined. In this example, p'=2N−p=2 (step S18). Further, since Z(p) represented by Equation 4 is located in the first quadrant when p=36, it is determined that the plus/minus sign of the imaginary part value of the table, i.e. Tb1 [2] is to be reversed, the table being provided with the data of fourth quadrant.

(10) The sequence value $a_2(3)$=0.9458+0.3247j is obtained by performing the determined process (step S19).

As described above, in the Zadoff-Chu sequence generator 5 or 21 for generating a Zadoff-Chu sequence with the sequence length N in the OFDM communications device in accordance with the embodiment of the present invention, all sequence data is generated by preparing data of the real part and imaginary part of γ0 represented by Equation 2 for each m, wherein m is limited within a range satisfying a relation 0≦m<(N+1)/2, in a table, and by using it.

Further, in the embodiment, the phase component of the Zadoff-Chu sequence is obtained by determining parameters such as the sequence number u, the data number k, the cyclic shift amount Δ and the cyclic shift number Ncs and then calculating k'=mod(k+Ncs×Δ, N), n=u×k'(k'+1) and p =mod (n, 2N).

In the embodiment, an operation of the table values can be determined by classifying Z(p) represented by Equation 4 into quadrants in the complex plane, i.e. into four patterns based on p.

Furthermore, in the embodiment, p is converted into p' which can be in the range of (N−1)/2 in accordance with the pattern based on p and the prepared table is referred by the address p'.

In the embodiment, the Zadoff-Chu sequence value is determined by adjusting the plus/minus sign of the real or imaginary part of the table value indicated by p' based on the pattern of p.

If the sequence number u, the data number k, the cyclic shift amount Δ and the cyclic shift number Ncs are determined, the fact that a sin and a cos value are uniquely determined from 2N sin/cos values when the sequence length is N and there are combinations having different plus/minus signs according to the regularities of the obtained values is used, which makes it possible to obtain a sequence with high accuracy by performing less processing or less resources in calculation.

In the embodiment, the sequence value with high accuracy can be obtained by minimal processing in the implementation of a Zadoff-Chu sequence on a calculator compared with the conventional method. Further, memory use can be reduced since less data is stored compared with the case when the conventional table storing all sequence values is used.

In the OFDM communications device in accordance with the embodiment of the present invention, the Zadoff-Chu sequence generator 5 or 21 includes a storage unit having a function of storing the table shown in FIG. 5 in a memory, a parameter acquisition unit for acquiring or determining the sequence number u, the data number k, the cyclic shift amount A and the cyclic shift number Ncs, a phase position detecting unit for detecting a phase position, i.e., quadrant, of a Zadoff-Chu sequence in a complex plane, a sequence determination unit for determining m, herein, a table reference address p', to read a real and an imaginary part value and further determining how to adjust a plus/minus sign of the real and imaginary parts and a sequence acquisition unit for acquiring the Zadoff-Chu sequence value $a_u(k)$ based on the determination result.

A second embodiment in accordance with the present invention will be described.

In the embodiment, the process performed by the Zadoff-Chu sequence generator 5 or 21 in the OFDM communications device shown in FIG. 1 will be mainly described.

Figure 7:
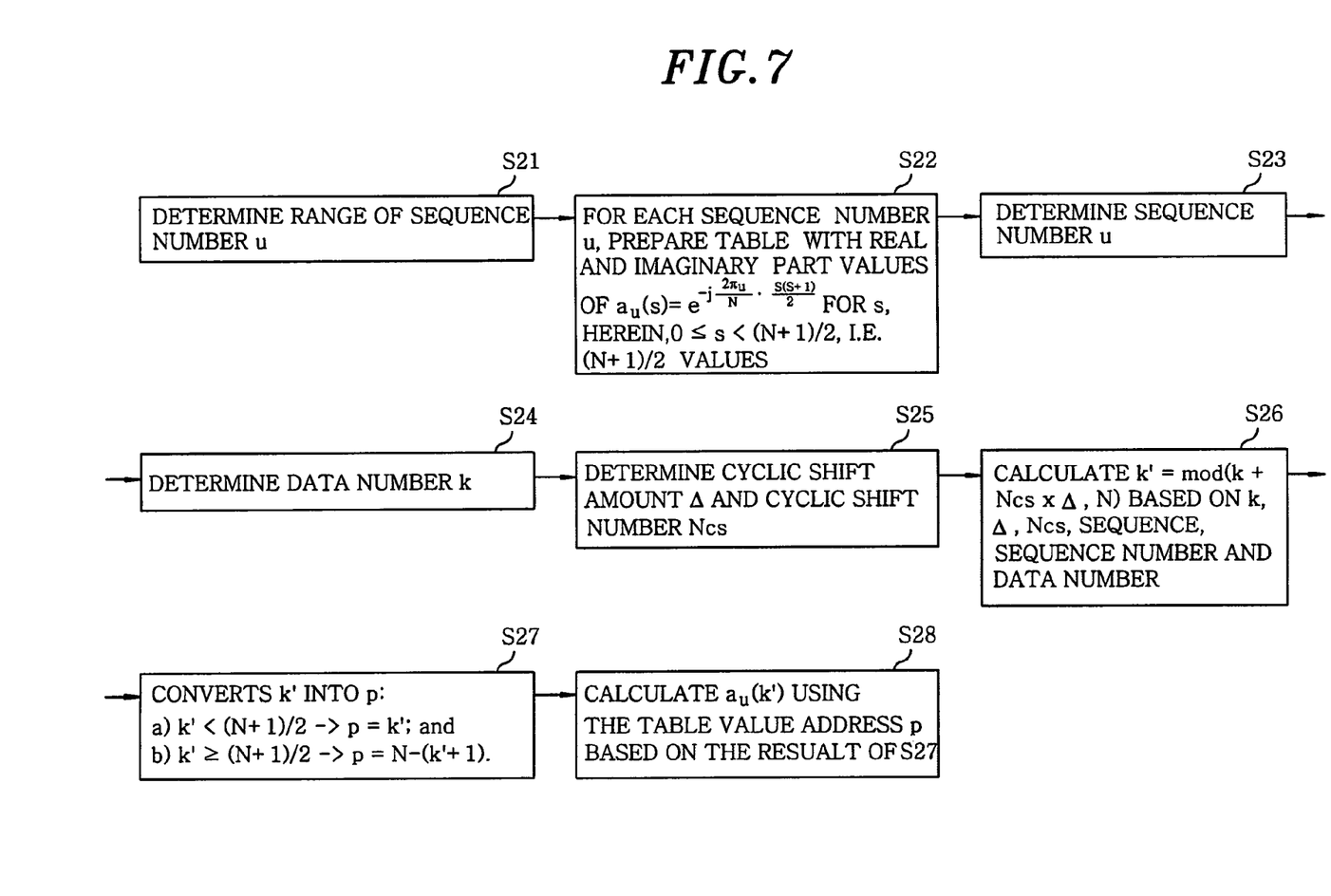
FIG. 7 is a flow chart for describing an exemplary process for generating a Zadoff-Chu sequence in accordance with a second embodiment.

FIG. 7 is a flow chart for describing an exemplary process including steps (1) to (8) for generating a Zadoff-Chu sequence.

First, parameters of the Zadoff-Chu sequence are described.

The sequence length N is a prime number (odd number) and the period is 2N.

The sequence number u is a code number and is, for example, constant. Further, several numbers or kinds of sequence numbers u may be provided.

The data number k changes consecutively such as 0, 1, 2, ..., and so forth.

The cyclic shift amount Δ indicates an initial position and is, for example, constant.

The cyclic shift number Ncs is, for example, constant.

Further, mod (A, B) indicates a remainder when A is divided by B.

Next, the process for generating a Zadoff-Chu sequence is described as follows.

(1) The range of the sequence number u is determined (step S21).

(2) For the determined sequence number u, each value of the real part and imaginary part of $a_u(s)$ represented by Equation 5 for each s satisfying a relation of 0≦s<(N+1)/2 is provided in a memory table. Therefore, (N+1)/2 values are provided for each of the real and imaginary parts. Herein, although N values are usually needed for a single sequence number, only (N+1)/2 values are prepared in the present embodiment (step S22).

$$a_u(s) = e^{-j\frac{2\pi u}{N} \cdot \frac{s(s+1)}{2}} \quad \text{[Equation 5]}$$

(3) The sequence number u is determined (step S23).

(4) The data number k is determined (step S24).

(5) The cyclic shift amount Δ and the cyclic shift number Ncs are determined (step S25).

(6) k'=mod(k+Ncs×Δ, N) is calculated by using the above parameters. Herein, k' which is greater than the sequence length N is converted into a value equal to or less than N since the data number k is shifted by Ncs×Δ by the cyclic shift (step S26).

(7) k' is converted into p in the following conditions a) and b):
  a) when k'<(N+1)/2, p=k'; and
  b) when k'≧(N+1)/2, p=N−(k'+1) (step S27).
(8) The table value corresponding to the address p is obtained and the K$^{th}$ sequence au(k) is calculated (step S28).

Here, $a_u(s)$, which is represented by Equation 5, when s is the data number k, is equal to $a_u(s)$ when s is the data number N−(k+1). Since all sequence values can be represented by converting the reference address by using such characteristics, only (N+1)/2 values, not N values, are needed as table data prepared in the step (1).

Further, how au(s) represented by Equation 5 when s is the data number k becomes equal to $a_u(s)$ when s is the data number N−(k+1) will be described.

First, $a_u(k)$ has a unique value since the phase component arg($a_u(k)$)=(2πu/N)·{k(k+1)/2}.

When k=N−(k+1), Equation 6 is satisfied.

$$a_u(N-(k+1)) = e^{-j\frac{2\pi u}{N}\cdot\frac{(N-(k+1))(N-(k+1)+1)}{2}}$$ [Equation 6]

In Equation 6, (2πu/N)·{(N−(k+1))(N−(k+1)+1)/2}=(2πu/N)·{k(k+1)+N(N−2k−1)}/2.

Since N is a prime number (odd number), N−2k−1 is always an even number and arg($a_u(N-(k+1))$)=arg($a_u(k)$) is held.

Therefore, $a_u(N-(k+1))$=$a_u(k)$ is satisfied.

An example will be described in detail.

Figure 8:
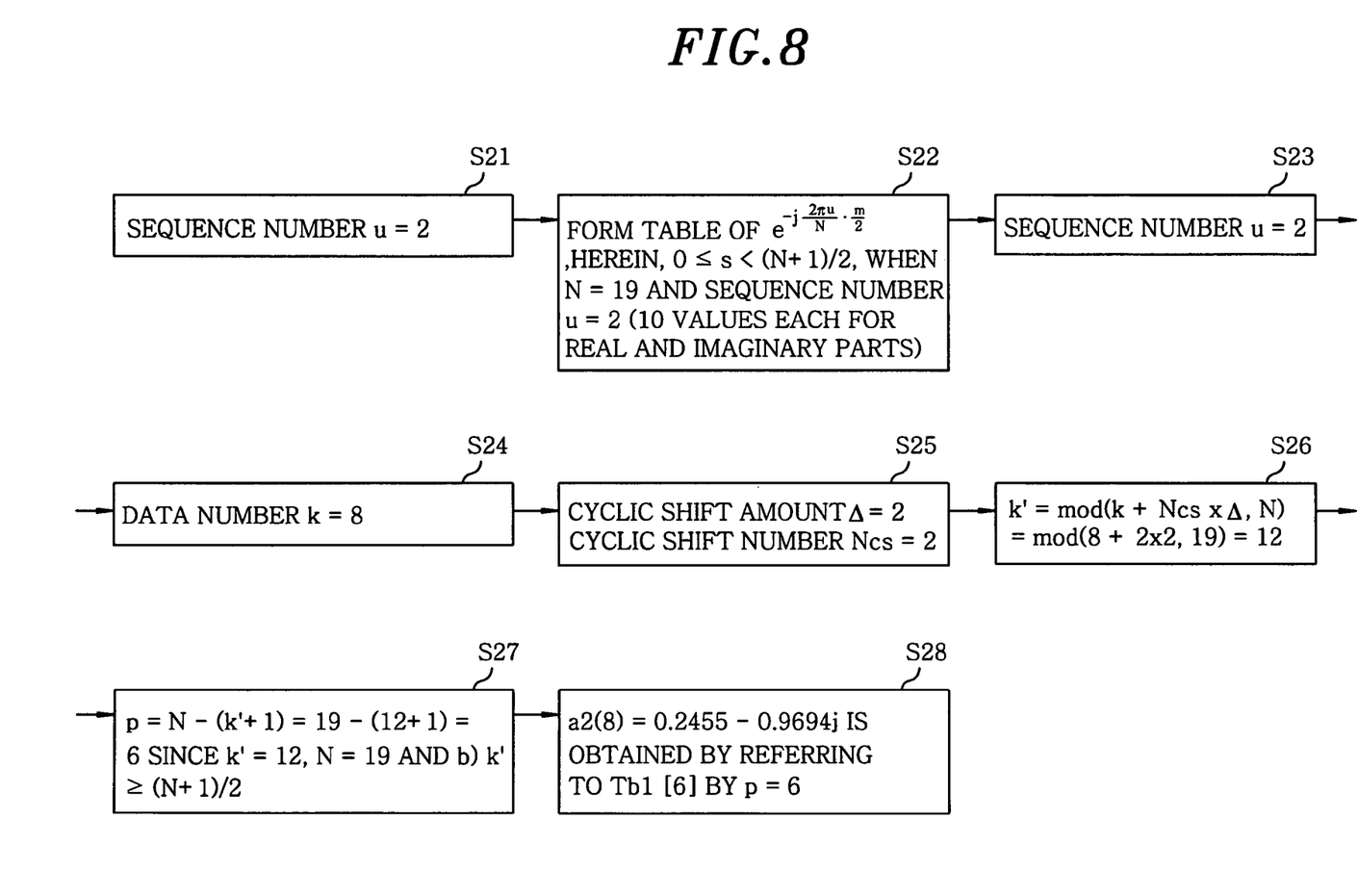
FIG. 8 is a flow chart for describing an exemplary process for generating a Zadoff-Chu sequence.

FIG. 8 is a flow chart for describing an exemplary process including steps (1) to (8) for generating a Zadoff-Chu sequence, which is a specific example of the process shown in FIG. 7.

(1) The range of the sequence number u is determined. In this example, u=2 (step S21).

(2) In this example, N=19 and u=2. Each value of the real part and imaginary part of $a_u(s)$ represented by Equation 5 for each s satisfying a relation of 0≦s<(N+1)/2 is provided in a table Tb1 []. Therefore, ten, i.e. (N+1)/2, values for each part are provided in the table (step S22).

Figure 9:
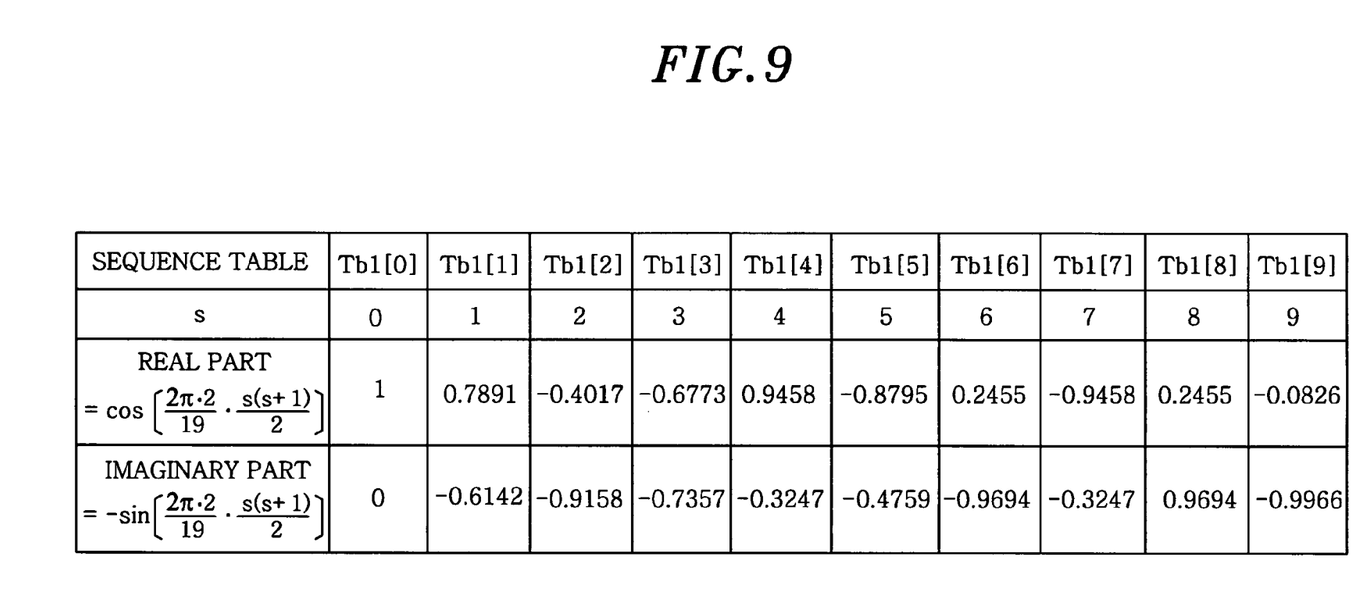
FIG. 9 shows an example of the table when u=2 and N=19.

FIG. 9 show an example of the table when u=2 and N=19.

(3) The sequence number u is determined. Herein, u=2 (step S23).

(4) The data number k is determined. Herein, k=8 (step S24).

(5) The cyclic shift amount Δ and the cyclic shift number Ncs are determined. Herein, Δ=2 and Ncs=2 (step S25).

(6) k'=mod(k+Ncs×Δ, N) is calculated using the above parameters. Herein, k'=12 (step S26).

(7) p is calculated by using k'. In this example, since k'=12 and N=19, k'≧(N+1)/2 and, thus, p=N−(k'+1)=6 (step S27).

(8) The k$^{th}$ (8$^{th}$) sequence value is calculated by acquiring Tb1[6] indicated by the address p (=6) from the table shown in FIG. 9 (step S28). Therefore, $a_2(8)$=0.2455−0.9694j is obtained.

As described above, in the Zadoff-Chu sequence generator 5 or 21 for generating a Zadoff-Chu sequence with the sequence length N of the OFDM communications device in accordance with the embodiment of the present invention, the Zadoff-Chu sequence of the sequence number u is generated and all sequence data is generated by preparing and using the table with the real and imaginary part values of $a_u(s)$ represented by Equation 5 for each s, herein, 0≦s<(N+1)/2.

In the embodiment, the sequence number u, the data number k, the cyclic shift amount Δ and the cyclic shift number Ncs are determined and then k'=mod(k+Ncs×Δ, N) is calculated. Based on k', the table reference address p is determined.

Furthermore, the Zadoff-Chu sequence value is determined by using the table value corresponding to the table reference address p.

In the embodiment, the fact that the Zadoff-Chu sequence values of the same sequence number u have the regularities is used, which makes it possible to obtain a sequence with high accuracy by performing less processing or using less resources on a calculator.

In the embodiment, the sequence value with high accuracy can be obtained by minimal processing in the implementation of a Zadoff-Chu sequence on a calculator compared with the conventional method. Further, memory use can be reduced since less data are stored compared with the case when the conventional table storing all sequence values is used.

In the OFDM communications device in accordance with the embodiment of the present invention, the Zadoff-Chu sequence generator 5 or 21 includes a storage unit having a function of storing the table shown in FIG. 9 in a memory, a parameter acquisition unit for acquiring or determining the sequence number u, the data number k, the cyclic shift amount Δ and the cyclic shift number Ncs, a sequence determination unit for determining s, the table reference address p in the present embodiment, to read the real and imaginary parts and a sequence acquisition unit for acquiring the Zadoff-Chu sequence value $a_u(k)$ based on the determination.

The structure of the system or device of the present invention is not limited to the above-described embodiments, but various structures may be used. The present invention may be implemented in the form of the method for performing the process of the present invention, the program for realizing the method or the storage medium storing the program and further various systems or devices may be provided as well.

Further, the application field of the present invention is not limited to the above-described embodiments, but the present invention may be applied to various fields.

The system or device in accordance with the present invention can be configured to have hardware resources including a processor and a memory wherein the processor executes a control program stored in the memory (ROM) to control the various processes of the system or device. Further, each functional unit for performing the corresponding process may be configured as an independent hardware circuit.

The control program of the present invention can be stored in a computer-readable storage medium such as a floppy disk (registered trademark) or a CD (Compact Disc)-ROM or the control program itself can be a part of the system or the device in accordance with the present invention. In this case, the control program is loaded into the computer from the storage medium so that the control program can be executed by the processor.

While the invention has been shown and described with respect to the embodiments, it will be understood by those skilled in the art that various changes and modification may be made without departing from the scope of the invention as defined in the following claims.

What is claimed is:

1. A communications device for generating a Zadoff-Chu sequence comprising:
  a storage unit for storing real and imaginary part values of exp{−j·(2π/N)·(m/2)} for the Zadoff-Chu sequence of a sequence length N, wherein m is an integer satisfying the relation of 0≦m<(N+1)/2;
  a parameter acquisition unit for acquiring a sequence number u, data number k, cyclic shift amount Δ and cyclic shift number Ncs;

a phase position detecting unit for detecting a phase position of the Zadoff-Chu sequence by using parameters acquired by the parameter acquisition unit;

a sequence determination unit for determining m to be used to read a real and an imaginary part value among those stored in the storage unit based on the phase position detected by the phase position detecting unit and for determining whether to change the plus/minus sign of each of the real and the imaginary part value read from the storage unit; and a sequence acquisition unit for acquiring the Zadoff-Chu sequence by using the real and the imaginary part value read from the storage unit according to m determined by the sequence determination unit and the signs thereof determined by the sequence determination unit.

* * * * *